US012778139B2

(12) United States Patent
Xia et al.

(10) Patent No.: US 12,778,139 B2
(45) **Date of Patent: *Nov. 3, 2026**

(54) METHOD OF USING/APPLYING A KERATIN HYDROLYSIS PEPTIDE SOLUTION TO PROMOTE GROWTH OF CORN UNDER LOW LIGHT CONDITION

(71) Applicant: CH Biotech R&D Co., Ltd., Nantou City (TW)

(72) Inventors: Kai Xia, Nantou (TW); Ya-Wen Huang, Taichung (TW); Yu-Yi Wu, Taichung (TW)

(73) Assignee: CH Biotech R&D Co., Ltd., Nantou City (TW)

( * ) Notice: Subject to any disclaimer, the term of this patent is extended or adjusted under 35 U.S.C. 154(b) by 308 days.

This patent is subject to a terminal disclaimer.

(21) Appl. No.: 18/643,756

(22) Filed: Apr. 23, 2024

(65) Prior Publication Data

US 2025/0176560 A1 Jun. 5, 2025

(30) Foreign Application Priority Data

Dec. 1, 2023 (TW) ................................ 112146911

(51) Int. Cl.
*A01N 63/50* (2020.01)
*A01N 25/02* (2006.01)
*A01P 21/00* (2006.01)

(52) U.S. Cl.
CPC ............. *A01N 63/50* (2020.01); *A01N 25/02* (2013.01); *A01P 21/00* (2021.08)

(58) Field of Classification Search
CPC ................................ A01N 63/50; A01P 21/00
See application file for complete search history.

(56) References Cited

U.S. PATENT DOCUMENTS

| | | | | |
|---|---|---|---|---|
| 8,617,282 | B2 * | 12/2013 | Szoeke | C05D 9/02 71/64.1 |
| 12,527,269 | B2 * | 1/2026 | Huang | A01H 3/04 |
| 2025/0081910 | A1 * | 3/2025 | Huang | C05G 5/23 |
| 2025/0081964 | A1 * | 3/2025 | Chen | A01N 37/46 |
| 2025/0081965 | A1 * | 3/2025 | Chen | A01P 21/00 |
| 2025/0081972 | A1 * | 3/2025 | Xia | A01N 63/50 |
| 2025/0084010 | A1 * | 3/2025 | Xia | C05G 5/23 |
| 2025/0084134 | A1 * | 3/2025 | Xia | C05F 11/10 |
| 2025/0101072 | A1 * | 3/2025 | Chen | C07K 14/4741 |
| 2025/0113794 | A1 * | 4/2025 | Xia | G01N 33/6848 |
| 2025/0113828 | A1 * | 4/2025 | Huang | A01N 63/50 |
| 2025/0127107 | A1 * | 4/2025 | Huang | A01H 3/04 |
| 2025/0128994 | A1 * | 4/2025 | Xia | C05F 11/10 |
| 2025/0128995 | A1 * | 4/2025 | Xia | C05F 11/10 |
| 2025/0136523 | A1 * | 5/2025 | Huang | C05C 11/00 |
| 2025/0136524 | A1 * | 5/2025 | Xia | C05F 1/005 |
| 2025/0143323 | A1 * | 5/2025 | Chen | A01P 21/00 |
| 2025/0145678 | A1 * | 5/2025 | Xia | C07K 14/4741 |
| 2025/0160325 | A1 * | 5/2025 | Xia | C12P 21/06 |
| 2025/0160336 | A1 * | 5/2025 | Huang | A01N 63/50 |
| 2025/0160337 | A1 * | 5/2025 | Xia | A01N 63/50 |
| 2025/0160338 | A1 * | 5/2025 | Xia | A01N 37/46 |
| 2025/0169507 | A1 * | 5/2025 | Xia | A01N 63/50 |
| 2025/0187995 | A1 * | 6/2025 | Chen | C05F 1/005 |
| 2025/0194606 | A1 * | 6/2025 | Xia | A01P 21/00 |
| 2025/0206677 | A1 * | 6/2025 | Xia | C05F 1/005 |
| 2025/0212892 | A1 * | 7/2025 | Chen | A01N 63/50 |
| 2025/0212893 | A1 * | 7/2025 | Huang | A01P 21/00 |
| 2025/0214906 | A1 * | 7/2025 | Xia | C05C 11/00 |
| 2025/0324978 | A1 * | 10/2025 | Huang | A01N 25/02 |
| 2025/0331517 | A1 * | 10/2025 | Huang | A01N 37/46 |

FOREIGN PATENT DOCUMENTS

| | | | |
|---|---|---|---|
| CN | 109650946 | * | 9/2021 |
| CN | 109650946 B | * | 9/2021 |
| WO | WO 2023001946 | * | 1/2023 |

OTHER PUBLICATIONS

Cheng et al. (Hydrolysis technology of biomass waste to produce amino acids in sub-critical water), Bioresource Technology, vol. 99, Jun. 2008, pp. 3337-3341. (Year: 2008).*

Yin et al, (Self-organization of oligopeptides obtained on dissolution of feather keratins in superheated water), Biomacromolecules, 2007, 8, pp. 800-806. (Year: 2007).*

Minkiewicz et al (BIOPEP-UWM database of the bioactive peptides: Current opportunities)., Int J Mol Sci. 2019, 20(23):5978, pp. 1-23. (Year: 2019).*

* cited by examiner

*Primary Examiner* — Mina Haghighatian
(74) *Attorney, Agent, or Firm* — Jen-Feng Lee, Esq

(57) ABSTRACT

Present invention teaches the method of using a keratin hydrolysis peptide ("KHP") solution to promote the growth of corn plants under low light conditions. By selectively choosing specific weights of feathers and water, and treating the mixture to a high-temperature high-pressure hydrolysis process, the resulting solution is confirmed to contain at least 253 peptides and then apply to the corn either by infusing to the soil at seeding stage or by leaf spray to the corn at vegetative stage. Optionally, the KHP solution can be diluted by water, as disclosed in the specification, for infusing or leaf spraying.

7 Claims, 5 Drawing Sheets

Specification includes a Sequence Listing.

METHOD OF USING/APPLYING A KERATIN HYDROLYSIS PEPTIDE SOLUTION TO PROMOTE GROWTH OF CORN UNDER LOW LIGHT CONDITION

PRIORITY CLAIM TO FOREIGN APPLICATION

Applicant hereby makes priority claim to a Taiwan application, number 112146911, having the Taiwan filing date of Dec. 1, 2023.

SEQUENCE LISTING/INCORPORATION BY REFERENCE

Table I (in Sequence Listing XML format) shows the at least 253 peptides and its annotated sequences for the solution generated in accordance with the disclosure of this application. The Sequence Listing XML file complies with the WIPO ST.26 requirements. Said XML copy, created on Mar. 17, 2024, is named Table-I-253_sequence and is 216 bytes in size.

Applicant hereby incorporates by reference said Sequence Listing XML file in its entirety as part of the disclosure and specification of the present application

BACKGROUND OF THE INVENTION

Present invention disclosed and claimed the method and application of a keratin hydrolysis peptide ("KHP") solution to promote the growth of corn plants under low light conditions.

The application of the KHP solution is by infusing the solution in the soil when corns are sown and until reaching the vegetative growth period; alternatively, by spraying the solution on the leaves of corns during the vegetative growth period.

Many factors will affect the growth and production of farming crops. The two dominant factors are insufficient light exposure and over-usage of nitrogen fertilizers.

Over-usage of nitrogen fertilizers similarly cause many plants to grow higher, though the internal metabolism of plants would become imbalanced, and will lead to weaker general health and lower ultimate production yield of farming crops.

When the light exposure is insufficient, the plants' photosynthesis activities are negatively affected, the internal hormones of plants would adjust and react to cause the plants to grow higher for better light exposure, this tends to generate slender stalk width. The insufficient light exposure problem also happens when plants are grown too densely together, resulting in reduced light exposure to leaves that are situated at lower height, and a Shade Avoidance Syndrome (SAS), that produced weaker stem/stalk and ultimately low production of farming crops.

Hydrolyzed keratin has long been used to strengthen hairs, reduce hair splitting and breakage. Other beneficial uses include skin moisturization and wound healing. Keratin hydrolysate has also been known to function as a biofertilizer, boosting plants' growth by enhancing the plants' ability to receive and utilize nutrients, including commonly applied fertilizers.

The KHP solution is made by a hydrolysis process using feathers and water, via a high-temperature and high-pressure process, resulting in a solution that has many beneficial applications in the fields of horticulture, agriculture and potentially other farming businesses.

Among the embodiments disclosed and claimed in this application, one specific embodiment used feathers only, without water, to be treated with the high-temperature and high-pressure process as taught herein to produce a specific version of the KHP solution.

The inventors, using the KHP solutions made as disclosed herein, and applied to the corn plants, at the seeding stage and during the vegetative stage, and proved that the adverse impact of the low light exposure can be effective remedied as more detailed below.

As disclosed herein, the application of the KHP solutions can be done by infusing to the soil when the seeds are planted, or by spraying to the leaf surface during the vegetative period, which is the time between the growth of third leaf circle to the growth of the fourth leaf circle. Either method of application can boost the development of above-ground bio mass and the under-ground root system of the corn plants, despite the corn plants may suffer from degraded photosynthesis and metabolism activities due to low light exposure.

SUMMARY OF THE INVENTION

The keratin solution is primarily based upon feather, which contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of a-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of *Pogostemon cablin* and *Vigna radiata*, as reported in International Journal of Recycling or Organic Waste in Agriculture (8:221-232, 2019).

The inventors of present application, under the aegis of CH Biotech, developed and selected different feather and water compositions to perform the hydrolysis at higher temperature and higher pressure setting, resulting with different keratin hydrolysis peptide ("KHP") solution that can be used on different crops/plants.

The selected embodiment of present invention uses a mixture of water and feathers, and subject the mixture to a thermal hydrolysis process to create KHP solutions based upon temperature/pressure parameters as noted below.

The inventors used Dionex UltiMate 3000 UPLC to separate the peptides; an analysis is done via Thermo Orbitrap Fushion Lumos Tribrid Orbitrap mass spectrometry to identify the peptides, which are then subsequently confirmed by looking up the BIOPEP-UWM database.

A preferred dilution ratio is 50-500 times (noted as 50×-500×) of water by volume.

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

DETAILED DESCRIPTION OF THE INVENTION

Figure 1:
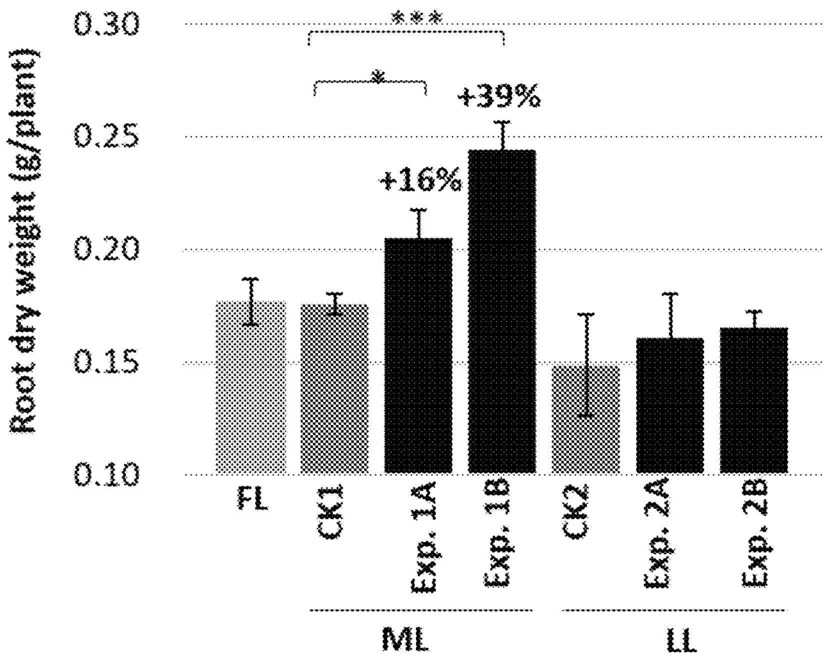
FIG. 1 shows the comparison of underground bio mass dry weights among Normal light group (exposed to full light), Medium light group (with Check, Experiment 1A and Experiment 1B sub-groups), and Low light group (with Check, Experiment 2A and Experiment 2B sub-groups).

The keratin hydrolysis peptide ("KHP") solution of present invention is made by a high-temperature and high-pressure process to treat a mixture of water and feathers as shown in the parameters herein.

The mixture ratio, temperature, pressure and duration parameters are shown herein:

| | Feather (kg) | Water (kg) | Water content in feather (%) | Pressure ($kg/cm^2$) | Temp. (°C) | Time (min) | Mass (Da) | Concen. (ppm) |
|---|---|---|---|---|---|---|---|---|
| 1 | 70 | 0 | 46% | 13 | 180 | 40 | 705.9~3194.7 | 381250 |
| 2 | 66 | 44 | 50% | 16 | 195 | 40 | 593.3~3828.0 | 200000 |

A first embodiment of keratin hydrolysis peptide (KHP) solution, without water, can be made by 70 kg of feathers, with the feathers' water content being 46%, and then treated by the steps of:

a. stirring the feathers in a sealed container;
b. hydrolyzing the feathers in the container with a temperature and pressure setting of 180° C. and 13 $kg/cm^2$ for a duration of 40 minutes;
c. using a mass spectrometer to confirm the combination of peptides in the solution to contain at least 253 peptides as listed in the specification whereby their molecular masses are between 705.9 and 3,194.7 Dalton, and the concentration is in the range of $2.0\times10^5$~$4.5\times10^5$ ppm.

The keratin hydrolysis peptide (KHP) solution of the first embodiment is further filtered and concentrated to 381,250 ppm concentration.

The hydrolysis process in the second embodiment takes the steps of:

a. Preparing the KHP solution by mixing 66 kg of feathers whose content is 50% water and 44 kg of water in a sealed container,
b. hydrolyzing the mixture in the container with a temperature and pressure setting of 195° C. and 16 $kg/cm^2$ for a duration of 40 minutes;
c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm.

The keratin hydrolysis peptide (KHP) solution of the second embodiment is further filtered and concentrated to 200,000 ppm concentration.

The confirmation of some of the 253 peptides is further done by referencing the BIOPEP-UWM database.

The KHP solution in the first embodiment will be denoted as KHP-1; the KHP solution in the second embodiment will be denoted as KHP-2. The solutions of both embodiments can be diluted with water at the ratio of between 50 times to 500 times, denoted as 50×-500×, before applied to the corn, either by infusing to the soil or by spraying to the leaf surface.

The method of applying the KHP solutions to corn plants, to remedy the adverse impact of low light exposure, depends on the timing of the application. Among the growth stages after germination of corn plants, the vegetative stage include VE (sheath leaf protruding from ground), V1 (first leaf circle visible), V2 (second leaf circle visible), V3 (third leaf circle visible), V4 (fourth leaf circle visible, stem top branching tissue underground), V5 (fifth leaf circle visible, stem top branching tissue above ground), etc.

The inventors tested the KHP solutions in two application methods to combat the adverse impact of low light exposure: soil infusion and leaf spray.

For the soil infusion, the KHP solutions were applied to the soil when corn seeds are planted into the soil. From seeding to the VE stage (about 6 days), using a shade to block out the light, creating the low light adverse condition.

The table below shows different groups of corn planting, up to the VE stage, and the growing conditions:

| Group | Illumination (Lux) | | Solution | Dilution |
|---|---|---|---|---|
| Normal lighting | Full light(FL) | 27,000 | water | — |
| Check 1 | Medium light(ML) | 19,000 | water | — |
| Experiment 1A | | | KHP-1 | 100 |
| Experiment 1B | | | KHP-1 | 50 |
| Check 2 | Low light (LL) | 12,000 | water | — |
| Experiment 2A | | | KHP-1 | 100 |
| Experiment 2B | | | KHP-1 | 50 |

The Normal Light Group is given full light (noted as FL), having illumination of 27,000 lux. Two groups (1 and 2) are given reduced light exposure. In each of the 2 groups, A and B sub-groups received KHP solutions with 100× and 50× dilution ratios respective.

The two reduced light groups (1 and 2) have light illumination of 19,000 lux (Medium Light, denoted as ML) and 12,000 lux (Low Light, denoted as LL).

Based upon the group settings defined herein, the inventors took various measurements to determine the underground bio mass dry weights and the boost from the method of KHP application to the medium and low light corn groups.

As shown in FIG. 1, the two reduced light groups 1 and 2 show worse underground bio mass dry weights than the Normal Light group; this especially so in the Low Light group.

With infusion of the KHP solutions after seeding, it can be seen that, under the Medium Light condition (group 2), the Experiment 1B sub-group, with KHP-1 50× solution, has the biggest boost to the root development, up to 39% over that of the Check group 1. The Experiment 1A sub-group, with KHP-1100× solution, shows 16% increase. Notably, the 2 sub-groups in the Medium Light group show better root system development than that of the Normal Light group.

In the Low Light group (group 2), the KHP-1 50× and KHP-1 100× applications shows improved root system development better than the Check 2 group, though they did not exceed that of the natural Normal Light group.

Figure 2A:
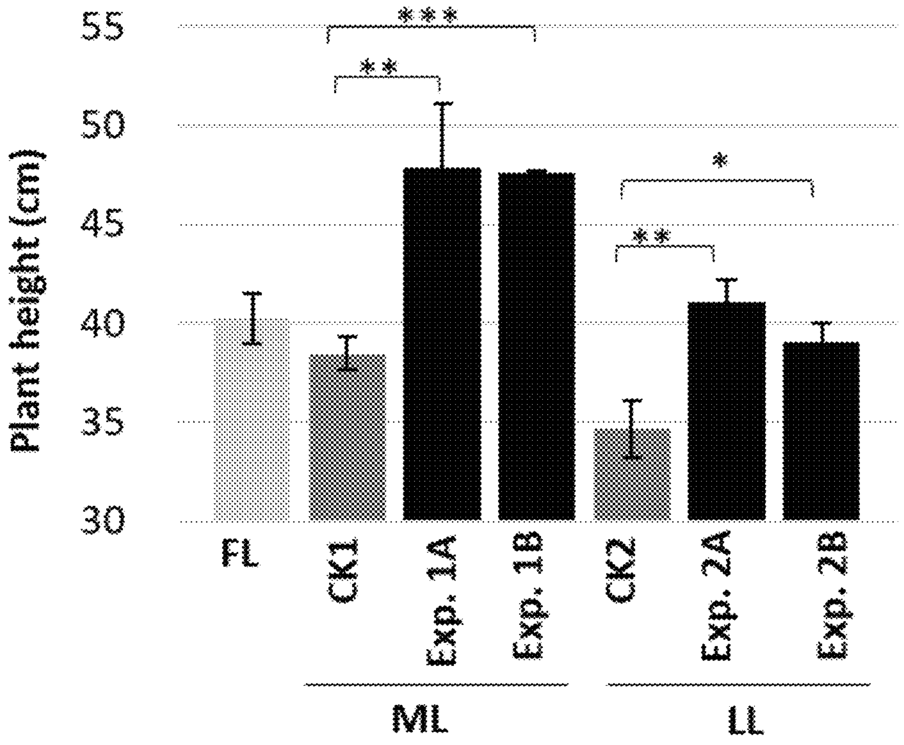
FIG. 2A shows the comparison of plant height among Normal light group (exposed to full light), Medium light group (with Check, Experiment 1A and Experiment 1B sub-groups), and Low light group (with Check, Experiment 2A and Experiment 2B sub-groups) after the KHP solutions are infused into the soil containing the corn seeds.
Figure 2B:
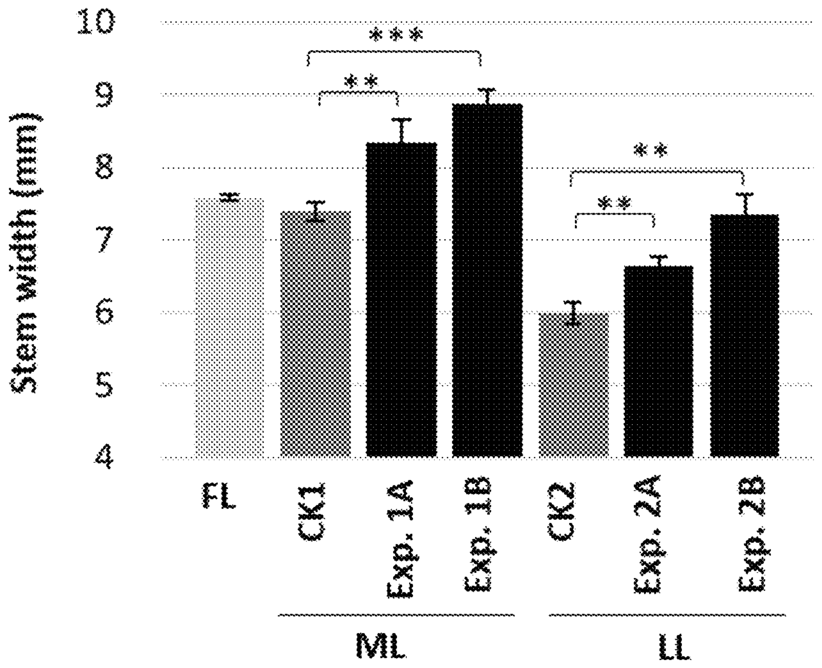
FIG. 2B shows the comparison of stalk width among Normal light group (exposed to full light), Medium light group (with Check, Experiment 1A and Experiment 1B sub-groups), and Low light group (with Check, Experiment 2A and Experiment 2B sub-groups) after the KHP solutions are infused into the soil containing the corn seeds.

The method of infusion of KHP-1 50× and KHP-1 100× at seeding stage also show improvement to the stalk height and width, as shown in FIGS. 2A and 2B.

FIG. 2A shows that, in the Medium Light group, not only are the stalk heights exceed the Check 1 group, they are also better than the Normal Light group. In the Low Light group, the KHP solutions effectively boost up the height of the corn plants than that of the Check 2 group, with that of the Experiment 2A group (KHP-1 100×) also exceeds that of the Normal Light group.

FIG. 2B shows that, in the Medium Light group, the Experiment 1A and Experiment 1B both have stalk width exceed the Check 1 group and the Normal Light group. In the Low Light group, the two sub-groups with the KHP-1 solutions show better stalk heights than that of the Check group 2. Also, in terms of the stalk width, the higher KHP solution's concentration has clearly better result.

Figure 3:
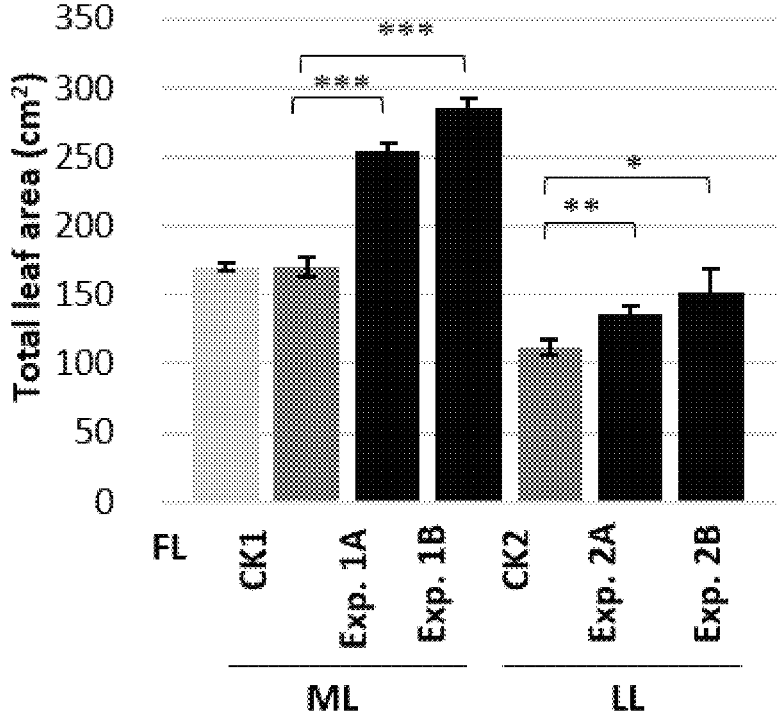
FIG. 3 shows the comparison of total leaf area among Normal light group (exposed to full light), Medium light group (with Check, Experiment 1A and Experiment 1B sub-groups), and Low light group (with Check, Experiment 2A and Experiment 2B sub-groups) after the KHP solutions are infused into the soil containing the corn seeds.

The remedial effect of the method of the KHP solutions to the leaf surface area, when infused to the soil containing the corn seeds, is shown in FIG. 3. It can be seen that in the Medium Light group, the Experiment 1A and Experiment 1B both have larger total leaf area than that of the Normal Light group. It is also obvious that higher KHP concentration (in 1B and 2B, using the 50× dilution ratio) works better.

Figure 4A:
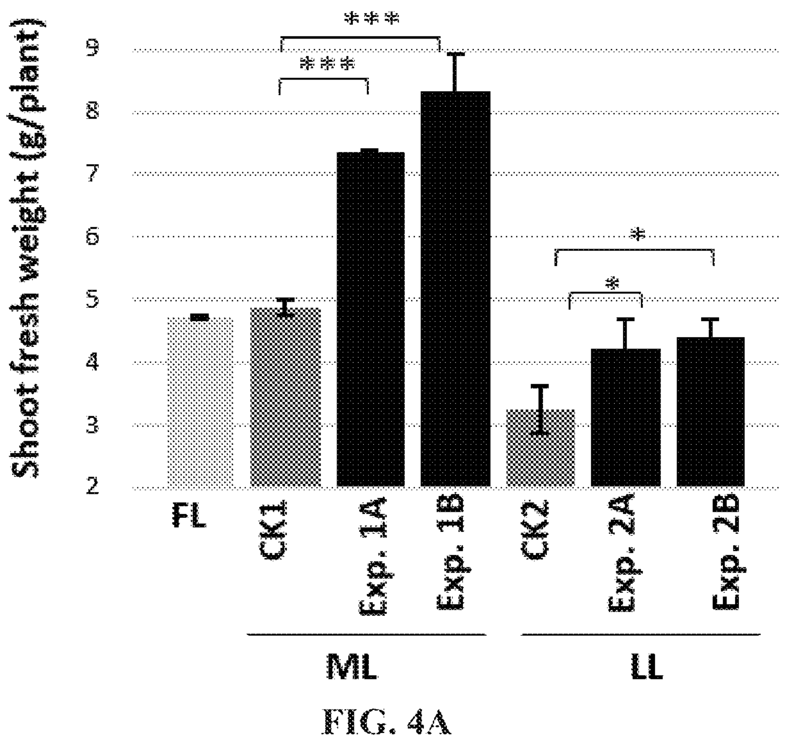
FIG. 4A shows the comparison of above-ground bio mass fresh weight among Normal light group (exposed to full light), Medium light group (with Check, Experiment 1A and Experiment 1B sub-groups), and Low light group (with Check, Experiment 2A and Experiment 2B sub-groups) after the KHP solutions are infused into the soil containing the corn seeds.

When measuring the above-ground bio mass dry weights and fresh weights, the remedial effect of the method of KHP solution to overcome the negative impact of lower light exposure. As shown in FIG. 4A, especially in the Medium Light group, both the Experiment 1A and Experiment 1B sub-groups show substantial improvement of fresh weights over the Check group 1, and even better than the Normal Light group. Also, in both Medium Light and Low Light groups, the higher KHP solution's concentration also has better remedial effect.

Figure 4B:
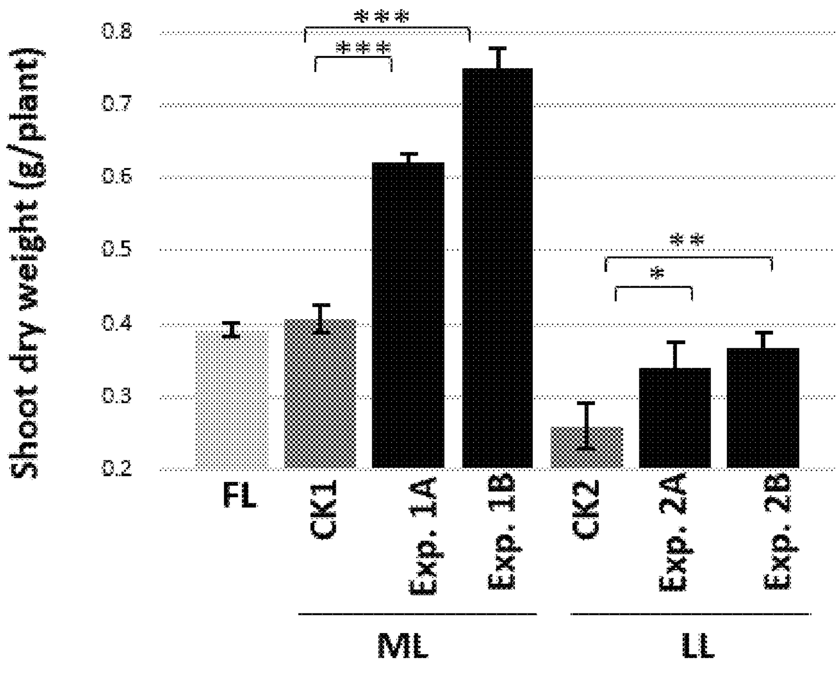
FIG. 4B shows the comparison of above-ground bio mass dry weight among Normal light group (exposed to full light), Medium light group (with Check, Experiment 1A and Experiment 1B sub-groups), and Low light group (with Check, Experiment 2A and Experiment 2B sub-groups) after the KHP solutions are infused into the soil containing the corn seeds.

FIG. 4B show the measurements of above-ground bio mass dry weights. The results are similar to those in FIG. 4A where the remedial effects in the Medium Light group are substantial, with the weights exceeding that of the Normal Light group; the higher KHP solution's concentration shows better result.

The inventors further tested the leaf spray application of the KHP-1 and KHP-2 solutions in a Group 3 setting as shown below. The Check 3 group is given water only whereas the Experiment 3A and Experiment 3B groups are given KHP-1 500× solution and KHP-2 500× solution respectively by leaf-spraying.

| Group | Illumination (Lux) | Solution | Dilution |
|---|---|---|---|
| Check 3 | 14,000 | water | — |
| Experiment 3A | | KHP-1 | 500 |
| Experiment 3B | | KHP-2 | 500 |

During the vegetative period of V3-V4, the light exposure is reduced to 14,000 lux, from the prior normal light illumination of 27,000 lux. The sub-groups of Experiment 3A and Experiment 3B are given leaf-spray of the KHP-1 and KHP-2 solutions, respectively, at the same 500× dilution ratio.

Figure 5A:
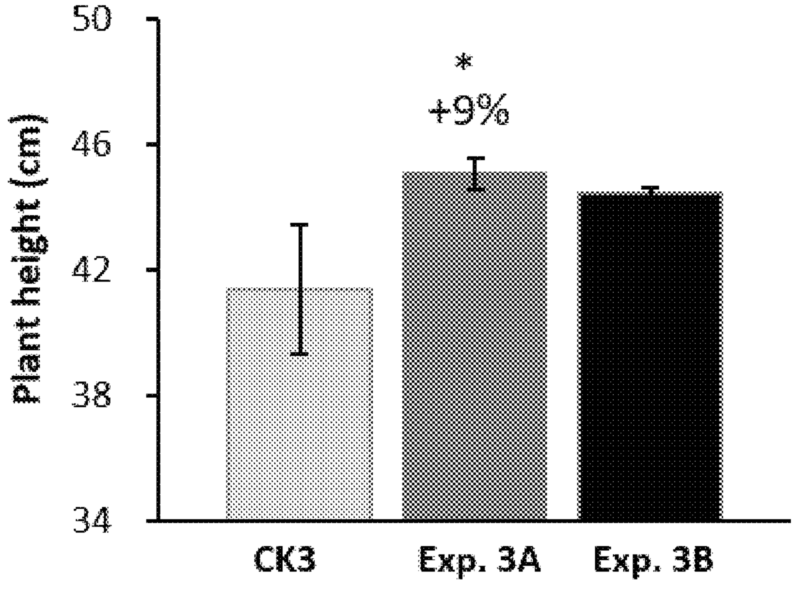
FIG. 5A shows the comparison of plant height among Check group 3, Experiment 3A and Experiment 3B groups after the leaf-spraying KHP solutions during the vegetative stage.
Figure 5B:
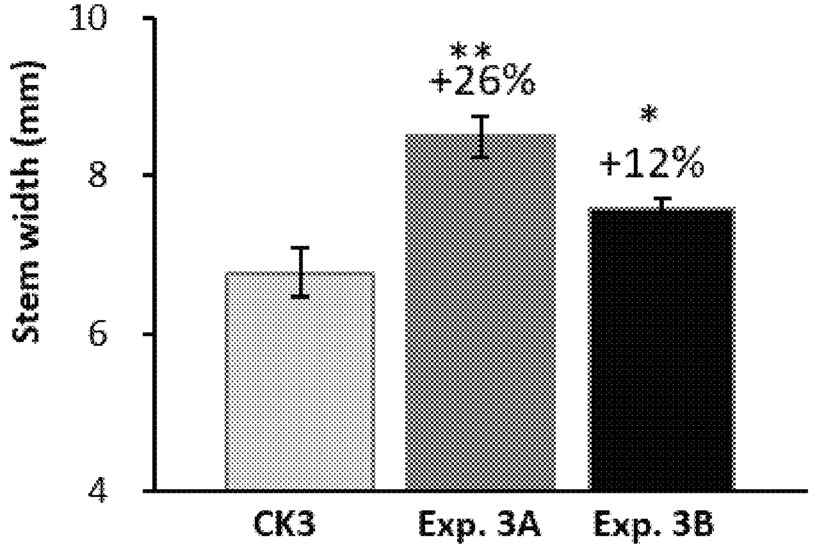
FIG. 5B shows the comparison of stalk width among Check group 3, Experiment 3A and Experiment 3B groups after the leaf-spraying KHP solutions during the vegetative stage.

FIG. 5A shows the remedial effect of the method of leaf-spray application of KHP solutions to the plant heights. FIG. 5B shows the remedial effect of the KHP solutions to the stalk width. As clearly shown, in a reduced light exposure setting, the leaf-spray application of the KHP solutions improved both plant's heights and stalk widths.

Figure 6:
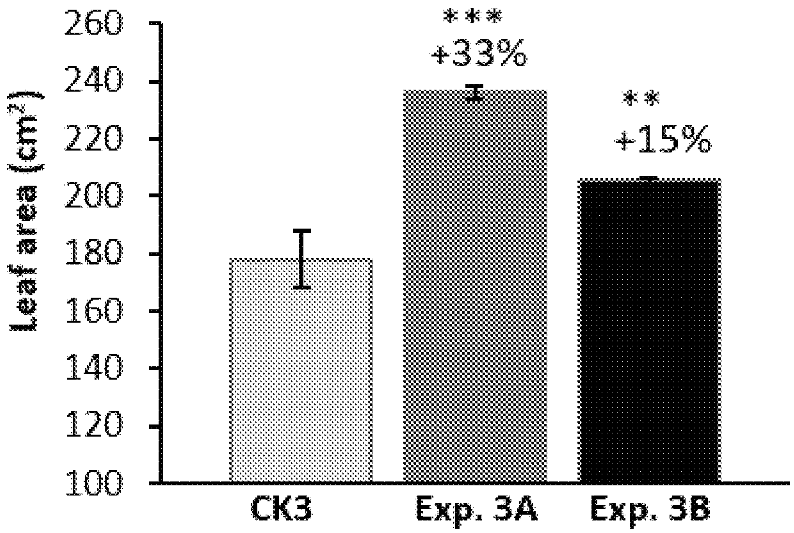
FIG. 6 shows the comparison of leaf surface are among Check group 3, Experiment 3A and Experiment 3B groups after the leaf-spraying KHP solutions during the vegetative stage.

FIG. 6 shows the result of leaf spray of KHP solutions, during the corn's vegetative period, to the leaf's surface area. As shown, both Experiment 3A and Experiment 3B groups have substantially larger leaf surface area than that of the Check 3 group.

Figure 7:
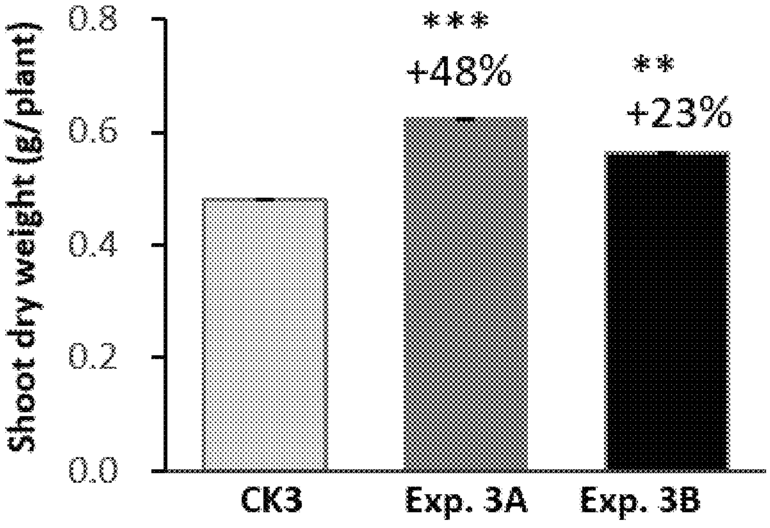
FIG. 7 shows the comparison of plant height among Check group 3, Experiment 3A and Experiment 3B groups after the leaf-spraying KHP solutions during the vegetative stage.

FIG. 7 shows the result of leaf spray of KHP solutions improved the above-ground bio mass dry weights over that of the Check 3 group under low light condition. Especially the Experiment 3A group shows 48% increase over that of the Check 3 group.

Based upon the tests and experiments done by the inventors, it is confirmed that application of the KHP solutions, at the dilution ratios and the growth stages as disclosed herein, worked to reduce the adverse impact of low light exposure to the corn's growth; in some instances, the corns aided by the KHP solutions perform better than the corn grown with normal light settings.

It can be seen that the method of applying KHP solutions as disclosed herein effectively remedied the injuries and stunted growth of corn under low light exposure, improved the capacities of metabolism and photosynthesis and, ultimately increased the production yield of corn.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A method of using a keratin hydrolysis peptide (KHP) solution to promote the growth of corn plants under low light conditions, comprising the steps of:

a. Preparing the KHP solution by placing 70 kg of feathers whose content is 46% water in a sealed container;

b. hydrolyzing the mixture in the container with a temperature and pressure setting of 180° C. and 13 $kg/cm^2$ for a duration of 40 minutes;

c. using a mass spectrometer to confirm the combination of peptides in the solution to contain 253 peptides as listed in the specification where their molecular masses are between 500 and 4,000 Daltons, and the concentration is in the range of $2.0\times10^5$~$4.5\times10^5$ ppm; and d. applying the KHP solution to the corn seeds or the corn's leaves.

2. The method of using a keratin hydrolysis peptide (KHP) solution of claim 1, wherein the solution is diluted with water by volume at the ratio of 1:50-500.

3. The method of using a keratin hydrolysis peptide solution of claim 2, wherein the solution is infused to the soil containing corn seeds.

4. The method of using a keratin hydrolysis peptide solution of claim 3, wherein the solution sprayed to the leaf's surface during the vegetative stage.

5. A method of using a keratin hydrolysis peptide (KHP) solution to promote the growth of corn plants under low light condition, comprising the steps of:

a. Preparing the KHP solution by mixing 66 kg of feathers whose content is 50% water and 44 kg of water in a sealed container;

b. hydrolyzing the mixture in the container with a temperature and pressure setting of 195° C. and 16 $kg/cm^2$ for a duration of 40 minutes;

c. using a mass spectrometer to confirm the combination of peptides in the solution to contain 253 peptides as listed in the specification where their molecular masses are between 500 and 4,000 Daltons, and the concentration is in the range of $2.0\times10^5$~$4.5\times10^5$ ppm; and d. applying the KHP solution by spraying to the leaves of corn plants at vegetative stage.

6. The method of using a keratin hydrolysis peptide solution of claim 5, wherein the leaf spraying is done at the time of V3 to V4 growth stages.

7. The method of using a keratin hydrolysis peptide solution of claim 6, wherein the solution is diluted with water by volume at the ratio of 1:50-500.

* * * * *

SEQUENCE LISTING

```
Sequence total quantity: 253
SEQ ID NO: 1            moltype = AA  length = 6
FEATURE                 Location/Qualifiers
source                  1..6
                        mol_type = protein
                        organism = Gallus gallus
SEQUENCE: 1
FGLSGL                                                                  6

SEQ ID NO: 2            moltype = AA  length = 7
FEATURE                 Location/Qualifiers
source                  1..7
                        mol_type = protein
                        organism = Gallus gallus
SEQUENCE: 2
AAVGSSL                                                                 7

SEQ ID NO: 3            moltype = AA  length = 7
FEATURE                 Location/Qualifiers
source                  1..7
                        mol_type = protein
                        organism = Gallus gallus
SEQUENCE: 3
TAVGSST                                                                 7

SEQ ID NO: 4            moltype = AA  length = 6
FEATURE                 Location/Qualifiers
source                  1..6
                        mol_type = protein
                        organism = Gallus gallus
SEQUENCE: 4
LSLSSQ                                                                  6

SEQ ID NO: 5            moltype = AA  length = 7
FEATURE                 Location/Qualifiers
source                  1..7
                        mol_type = protein
                        organism = Gallus gallus
SEQUENCE: 5
FGISGLG                                                                 7

SEQ ID NO: 6            moltype = AA  length = 6
FEATURE                 Location/Qualifiers
source                  1..6
                        mol_type = protein
                        organism = Gallus gallus
SEQUENCE: 6
PILSSF                                                                  6

SEQ ID NO: 7            moltype = AA  length = 7
FEATURE                 Location/Qualifiers
source                  1..7
                        mol_type = protein
                        organism = Gallus gallus
SEQUENCE: 7
SLLSQGA                                                                 7

SEQ ID NO: 8            moltype = AA  length = 6
FEATURE                 Location/Qualifiers
source                  1..6
                        mol_type = protein
                        organism = Gallus gallus
SEQUENCE: 8
FNLRGA                                                                  6

SEQ ID NO: 9            moltype = AA  length = 8
FEATURE                 Location/Qualifiers
source                  1..8
                        mol_type = protein
                        organism = Gallus gallus
```

```
SEQUENCE: 9
SAAVGSSL                                                         8

SEQ ID NO: 10          moltype = AA  length = 6
FEATURE                Location/Qualifiers
source                 1..6
                       mol_type = protein
                       organism = Gallus gallus
SEQUENCE: 10
SRVVIQ                                                           6

SEQ ID NO: 11          moltype = AA  length = 6
FEATURE                Location/Qualifiers
source                 1..6
                       mol_type = protein
                       organism = Gallus gallus
SEQUENCE: 11
SRVVLE                                                           6

SEQ ID NO: 12          moltype = AA  length = 8
FEATURE                Location/Qualifiers
source                 1..8
                       mol_type = protein
                       organism = Gallus gallus
SEQUENCE: 12
GFGISGLG                                                         8

SEQ ID NO: 13          moltype = AA  length = 6
FEATURE                Location/Qualifiers
source                 1..6
                       mol_type = protein
                       organism = Gallus gallus
SEQUENCE: 13
SRFSGR                                                           6

SEQ ID NO: 14          moltype = AA  length = 6
FEATURE                Location/Qualifiers
source                 1..6
                       mol_type = protein
                       organism = Gallus gallus
SEQUENCE: 14
RVVIQP                                                           6

SEQ ID NO: 15          moltype = AA  length = 8
FEATURE                Location/Qualifiers
source                 1..8
                       mol_type = protein
                       organism = Gallus gallus
SEQUENCE: 15
SAAVGSIL                                                         8

SEQ ID NO: 16          moltype = AA  length = 7
FEATURE                Location/Qualifiers
source                 1..7
                       mol_type = protein
                       organism = Gallus gallus
SEQUENCE: 16
IVVIGHV                                                          7

SEQ ID NO: 17          moltype = AA  length = 9
FEATURE                Location/Qualifiers
source                 1..9
                       mol_type = protein
                       organism = Gallus gallus
SEQUENCE: 17
TAVGSSTSA                                                        9

SEQ ID NO: 18          moltype = AA  length = 7
FEATURE                Location/Qualifiers
source                 1..7
                       mol_type = protein
                       organism = Gallus gallus
SEQUENCE: 18
RVVIQPS                                                          7

SEQ ID NO: 19          moltype = AA  length = 7
FEATURE                Location/Qualifiers
```

```
source                1..7
                      mol_type = protein
                      organism = Gallus gallus
SEQUENCE: 19
SRVVIQP                                                      7

SEQ ID NO: 20         moltype = AA  length = 7
FEATURE               Location/Qualifiers
source                1..7
                      mol_type = protein
                      organism = Gallus gallus
SEQUENCE: 20
PQGEQLQ                                                      7

SEQ ID NO: 21         moltype = AA  length = 9
FEATURE               Location/Qualifiers
source                1..9
                      mol_type = protein
                      organism = Gallus gallus
SEQUENCE: 21
RAGAGPPSP                                                    9

SEQ ID NO: 22         moltype = AA  length = 7
FEATURE               Location/Qualifiers
source                1..7
                      mol_type = protein
                      organism = Gallus gallus
SEQUENCE: 22
DSRVVIQ                                                      7

SEQ ID NO: 23         moltype = AA  length = 8
FEATURE               Location/Qualifiers
source                1..8
                      mol_type = protein
                      organism = Gallus gallus
SEQUENCE: 23
PGPILSSF                                                     8

SEQ ID NO: 24         moltype = AA  length = 9
FEATURE               Location/Qualifiers
source                1..9
                      mol_type = protein
                      organism = Gallus gallus
SEQUENCE: 24
PISSGGFGI                                                    9

SEQ ID NO: 25         moltype = AA  length = 8
FEATURE               Location/Qualifiers
source                1..8
                      mol_type = protein
                      organism = Gallus gallus
SEQUENCE: 25
ISGLGSRF                                                     8

SEQ ID NO: 26         moltype = AA  length = 10
FEATURE               Location/Qualifiers
source                1..10
                      mol_type = protein
                      organism = Gallus gallus
SEQUENCE: 26
SGGFGISGLG                                                   10

SEQ ID NO: 27         moltype = AA  length = 7
FEATURE               Location/Qualifiers
source                1..7
                      mol_type = protein
                      organism = Gallus gallus
SEQUENCE: 27
SRFSGRR                                                      7

SEQ ID NO: 28         moltype = AA  length = 9
FEATURE               Location/Qualifiers
source                1..9
                      mol_type = protein
                      organism = Gallus gallus
SEQUENCE: 28
PGLALPVLP                                                    9

SEQ ID NO: 29         moltype = AA  length = 8
```

```
FEATURE                  Location/Qualifiers
source                   1..8
                         mol_type = protein
                         organism = Gallus gallus
SEQUENCE: 29
SRVVIQPS                                                            8

SEQ ID NO: 30            moltype = AA  length = 8
FEATURE                  Location/Qualifiers
source                   1..8
                         mol_type = protein
                         organism = Gallus gallus
SEQUENCE: 30
PILSSFPQ                                                            8

SEQ ID NO: 31            moltype = AA  length = 8
FEATURE                  Location/Qualifiers
source                   1..8
                         mol_type = protein
                         organism = Gallus gallus
SEQUENCE: 31
LGSGIFWI                                                            8

SEQ ID NO: 32            moltype = AA  length = 9
FEATURE                  Location/Qualifiers
source                   1..9
                         mol_type = protein
                         organism = Gallus gallus
SEQUENCE: 32
GISGLGSRF                                                           9

SEQ ID NO: 33            moltype = AA  length = 9
FEATURE                  Location/Qualifiers
source                   1..9
                         mol_type = protein
                         organism = Gallus gallus
SEQUENCE: 33
VVVTLPGPI                                                           9

SEQ ID NO: 34            moltype = AA  length = 8
FEATURE                  Location/Qualifiers
source                   1..8
                         mol_type = protein
                         organism = Gallus gallus
SEQUENCE: 34
CRLSLSQP                                                            8

SEQ ID NO: 35            moltype = AA  length = 11
FEATURE                  Location/Qualifiers
source                   1..11
                         mol_type = protein
                         organism = Gallus gallus
SEQUENCE: 35
SAAVGSSLSA G                                                        11

SEQ ID NO: 36            moltype = AA  length = 11
FEATURE                  Location/Qualifiers
source                   1..11
                         mol_type = protein
                         organism = Gallus gallus
SEQUENCE: 36
AVGSSTSAAV G                                                        11

SEQ ID NO: 37            moltype = AA  length = 9
FEATURE                  Location/Qualifiers
source                   1..9
                         mol_type = protein
                         organism = Gallus gallus
SEQUENCE: 37
VVTLPGPIL                                                           9

SEQ ID NO: 38            moltype = AA  length = 9
FEATURE                  Location/Qualifiers
source                   1..9
                         mol_type = protein
                         organism = Gallus gallus
SEQUENCE: 38
PGPILSSFP                                                           9
```

-continued

```
SEQ ID NO: 39          moltype = AA  length = 10
FEATURE                Location/Qualifiers
source                 1..10
                       mol_type = protein
                       organism = Gallus gallus
SEQUENCE: 39
SAAVGSILSE                                                    10

SEQ ID NO: 40          moltype = AA  length = 10
FEATURE                Location/Qualifiers
source                 1..10
                       mol_type = protein
                       organism = Gallus gallus
SEQUENCE: 40
VPISSGGFGI                                                    10

SEQ ID NO: 41          moltype = AA  length = 8
FEATURE                Location/Qualifiers
source                 1..8
                       mol_type = protein
                       organism = Gallus gallus
SEQUENCE: 41
QLAQRNTI                                                      8

SEQ ID NO: 42          moltype = AA  length = 9
FEATURE                Location/Qualifiers
source                 1..9
                       mol_type = protein
                       organism = Gallus gallus
SEQUENCE: 42
LSGLRSNLS                                                     9

SEQ ID NO: 43          moltype = AA  length = 10
FEATURE                Location/Qualifiers
source                 1..10
                       mol_type = protein
                       organism = Gallus gallus
SEQUENCE: 43
PSPVVVTLPG                                                    10

SEQ ID NO: 44          moltype = AA  length = 10
FEATURE                Location/Qualifiers
source                 1..10
                       mol_type = protein
                       organism = Gallus gallus
SEQUENCE: 44
PPPVVVTLPG                                                    10

SEQ ID NO: 45          moltype = AA  length = 10
FEATURE                Location/Qualifiers
source                 1..10
                       mol_type = protein
                       organism = Gallus gallus
SEQUENCE: 45
ISGLGSRFSG                                                    10

SEQ ID NO: 46          moltype = AA  length = 9
FEATURE                Location/Qualifiers
source                 1..9
                       mol_type = protein
                       organism = Gallus gallus
SEQUENCE: 46
LALRQSVEA                                                     9

SEQ ID NO: 47          moltype = AA  length = 10
FEATURE                Location/Qualifiers
source                 1..10
                       mol_type = protein
                       organism = Gallus gallus
SEQUENCE: 47
PLLGPPLLGI                                                    10

SEQ ID NO: 48          moltype = AA  length = 10
FEATURE                Location/Qualifiers
source                 1..10
                       mol_type = protein
                       organism = Gallus gallus
SEQUENCE: 48
VVTLPGPILS                                                    10
```

```
SEQ ID NO: 49           moltype = AA  length = 8
FEATURE                 Location/Qualifiers
source                  1..8
                        mol_type = protein
                        organism = Gallus gallus
SEQUENCE: 49
VTLEDLRR                                                                    8

SEQ ID NO: 50           moltype = AA  length = 9
FEATURE                 Location/Qualifiers
source                  1..9
                        mol_type = protein
                        organism = Gallus gallus
SEQUENCE: 50
PILSSFPQN                                                                   9

SEQ ID NO: 51           moltype = AA  length = 9
FEATURE                 Location/Qualifiers
source                  1..9
                        mol_type = protein
                        organism = Gallus gallus
SEQUENCE: 51
PILSSFPQD                                                                   9

SEQ ID NO: 52           moltype = AA  length = 11
FEATURE                 Location/Qualifiers
source                  1..11
                        mol_type = protein
                        organism = Gallus gallus
SEQUENCE: 52
GTVGVSAGVT R                                                                11

SEQ ID NO: 53           moltype = AA  length = 9
FEATURE                 Location/Qualifiers
source                  1..9
                        mol_type = protein
                        organism = Gallus gallus
SEQUENCE: 53
FGLSRVTLN                                                                   9

SEQ ID NO: 54           moltype = AA  length = 12
FEATURE                 Location/Qualifiers
source                  1..12
                        mol_type = protein
                        organism = Gallus gallus
SEQUENCE: 54
TAVGSSTSAA VG                                                               12

SEQ ID NO: 55           moltype = AA  length = 10
FEATURE                 Location/Qualifiers
source                  1..10
                        mol_type = protein
                        organism = Gallus gallus
SEQUENCE: 55
VVVTLPGPIL                                                                  10

SEQ ID NO: 56           moltype = AA  length = 10
FEATURE                 Location/Qualifiers
source                  1..10
                        mol_type = protein
                        organism = Gallus gallus
SEQUENCE: 56
PPVVVTFPGP                                                                  10

SEQ ID NO: 57           moltype = AA  length = 10
FEATURE                 Location/Qualifiers
source                  1..10
                        mol_type = protein
                        organism = Gallus gallus
SEQUENCE: 57
PPPVVVTFPG                                                                  10

SEQ ID NO: 58           moltype = AA  length = 10
FEATURE                 Location/Qualifiers
source                  1..10
                        mol_type = protein
                        organism = Gallus gallus
```

```
SEQUENCE: 58
VVIQPSPVVV                                                       10

SEQ ID NO: 59           moltype = AA  length = 10
FEATURE                 Location/Qualifiers
source                  1..10
                        mol_type = protein
                        organism = Gallus gallus
SEQUENCE: 59
FGISGLGSRF                                                       10

SEQ ID NO: 60           moltype = AA  length = 10
FEATURE                 Location/Qualifiers
source                  1..10
                        mol_type = protein
                        organism = Gallus gallus
SEQUENCE: 60
PGPILSSFPQ                                                       10

SEQ ID NO: 61           moltype = AA  length = 10
FEATURE                 Location/Qualifiers
source                  1..10
                        mol_type = protein
                        organism = Gallus gallus
SEQUENCE: 61
FGWSGLGRGL                                                       10

SEQ ID NO: 62           moltype = AA  length = 9
FEATURE                 Location/Qualifiers
source                  1..9
                        mol_type = protein
                        organism = Gallus gallus
SEQUENCE: 62
LEAQLSELR                                                        9

SEQ ID NO: 63           moltype = AA  length = 9
FEATURE                 Location/Qualifiers
source                  1..9
                        mol_type = protein
                        organism = Gallus gallus
SEQUENCE: 63
IVGAWYTVR                                                        9

SEQ ID NO: 64           moltype = AA  length = 11
FEATURE                 Location/Qualifiers
source                  1..11
                        mol_type = protein
                        organism = Gallus gallus
SEQUENCE: 64
LLSPPGLPGL L                                                     11

SEQ ID NO: 65           moltype = AA  length = 11
FEATURE                 Location/Qualifiers
source                  1..11
                        mol_type = protein
                        organism = Gallus gallus
SEQUENCE: 65
VVVTLPGPIL S                                                     11

SEQ ID NO: 66           moltype = AA  length = 11
FEATURE                 Location/Qualifiers
source                  1..11
                        mol_type = protein
                        organism = Gallus gallus
SEQUENCE: 66
GFGISGLGSR F                                                     11

SEQ ID NO: 67           moltype = AA  length = 11
FEATURE                 Location/Qualifiers
source                  1..11
                        mol_type = protein
                        organism = Gallus gallus
SEQUENCE: 67
PVVVTLPGPI L                                                     11

SEQ ID NO: 68           moltype = AA  length = 11
FEATURE                 Location/Qualifiers
```

```
source                  1..11
                        mol_type = protein
                        organism = Gallus gallus
SEQUENCE: 68
VSQGEITVPS I                                                            11

SEQ ID NO: 69           moltype = AA  length = 11
FEATURE                 Location/Qualifiers
source                  1..11
                        mol_type = protein
                        organism = Gallus gallus
SEQUENCE: 69
SILSEEGVPI S                                                            11

SEQ ID NO: 70           moltype = AA  length = 11
FEATURE                 Location/Qualifiers
source                  1..11
                        mol_type = protein
                        organism = Gallus gallus
SEQUENCE: 70
PVVVTFPGPI L                                                            11

SEQ ID NO: 71           moltype = AA  length = 13
FEATURE                 Location/Qualifiers
source                  1..13
                        mol_type = protein
                        organism = Gallus gallus
SEQUENCE: 71
PISSGGFGIS GLG                                                          13

SEQ ID NO: 72           moltype = AA  length = 13
FEATURE                 Location/Qualifiers
source                  1..13
                        mol_type = protein
                        organism = Gallus gallus
SEQUENCE: 72
VGSSTSAAVG SIL                                                          13

SEQ ID NO: 73           moltype = AA  length = 11
FEATURE                 Location/Qualifiers
source                  1..11
                        mol_type = protein
                        organism = Gallus gallus
SEQUENCE: 73
GFLSSAVSLN R                                                            11

SEQ ID NO: 74           moltype = AA  length = 12
FEATURE                 Location/Qualifiers
source                  1..12
                        mol_type = protein
                        organism = Gallus gallus
SEQUENCE: 74
GGFGISGLGS RF                                                           12

SEQ ID NO: 75           moltype = AA  length = 11
FEATURE                 Location/Qualifiers
source                  1..11
                        mol_type = protein
                        organism = Gallus gallus
SEQUENCE: 75
PGPILSSFPQ N                                                            11

SEQ ID NO: 76           moltype = AA  length = 11
FEATURE                 Location/Qualifiers
source                  1..11
                        mol_type = protein
                        organism = Gallus gallus
SEQUENCE: 76
PGPILSSFPQ D                                                            11

SEQ ID NO: 77           moltype = AA  length = 12
FEATURE                 Location/Qualifiers
source                  1..12
                        mol_type = protein
                        organism = Gallus gallus
SEQUENCE: 77
GGFGWSGLGR GL                                                           12

SEQ ID NO: 78           moltype = AA  length = 12
```

```
FEATURE                 Location/Qualifiers
source                  1..12
                        mol_type = protein
                        organism = Gallus gallus
SEQUENCE: 78
PSPVVVTLPG PI                                                 12

SEQ ID NO: 79           moltype = AA  length = 12
FEATURE                 Location/Qualifiers
source                  1..12
                        mol_type = protein
                        organism = Gallus gallus
SEQUENCE: 79
VVVTLPGPIL SS                                                 12

SEQ ID NO: 80           moltype = AA  length = 12
FEATURE                 Location/Qualifiers
source                  1..12
                        mol_type = protein
                        organism = Gallus gallus
SEQUENCE: 80
PVVVTLPGPI LS                                                 12

SEQ ID NO: 81           moltype = AA  length = 12
FEATURE                 Location/Qualifiers
source                  1..12
                        mol_type = protein
                        organism = Gallus gallus
SEQUENCE: 81
SPVVVTLPGP IL                                                 12

SEQ ID NO: 82           moltype = AA  length = 11
FEATURE                 Location/Qualifiers
source                  1..11
                        mol_type = protein
                        organism = Gallus gallus
SEQUENCE: 82
RVVIQPSPVV V                                                  11

SEQ ID NO: 83           moltype = AA  length = 11
FEATURE                 Location/Qualifiers
source                  1..11
                        mol_type = protein
                        organism = Gallus gallus
SEQUENCE: 83
QALTEVYAKA N                                                  11

SEQ ID NO: 84           moltype = AA  length = 10
FEATURE                 Location/Qualifiers
source                  1..10
                        mol_type = protein
                        organism = Gallus gallus
SEQUENCE: 84
IETLTQFLGW                                                    10

SEQ ID NO: 85           moltype = AA  length = 13
FEATURE                 Location/Qualifiers
source                  1..13
                        mol_type = protein
                        organism = Gallus gallus
SEQUENCE: 85
GFGSRSLVGL GGT                                                13

SEQ ID NO: 86           moltype = AA  length = 14
FEATURE                 Location/Qualifiers
source                  1..14
                        mol_type = protein
                        organism = Gallus gallus
SEQUENCE: 86
AVGSSTSAAV GSIL                                               14

SEQ ID NO: 87           moltype = AA  length = 12
FEATURE                 Location/Qualifiers
source                  1..12
                        mol_type = protein
                        organism = Gallus gallus
SEQUENCE: 87
PVVVTFPGPI LS                                                 12
```

-continued

```
SEQ ID NO: 88           moltype = AA  length = 14
FEATURE                 Location/Qualifiers
source                  1..14
                        mol_type = protein
                        organism = Gallus gallus
SEQUENCE: 88
VGSSTSAAVG SILS                                                    14

SEQ ID NO: 89           moltype = AA  length = 13
FEATURE                 Location/Qualifiers
source                  1..13
                        mol_type = protein
                        organism = Gallus gallus
SEQUENCE: 89
GFGISGLGSR FSG                                                     13

SEQ ID NO: 90           moltype = AA  length = 13
FEATURE                 Location/Qualifiers
source                  1..13
                        mol_type = protein
                        organism = Gallus gallus
SEQUENCE: 90
SGGFGISGLG SRF                                                     13

SEQ ID NO: 91           moltype = AA  length = 14
FEATURE                 Location/Qualifiers
source                  1..14
                        mol_type = protein
                        organism = Gallus gallus
SEQUENCE: 91
VPISSGGFGI SGLG                                                    14

SEQ ID NO: 92           moltype = AA  length = 12
FEATURE                 Location/Qualifiers
source                  1..12
                        mol_type = protein
                        organism = Gallus gallus
SEQUENCE: 92
VVIQPSPVVV TL                                                      12

SEQ ID NO: 93           moltype = AA  length = 13
FEATURE                 Location/Qualifiers
source                  1..13
                        mol_type = protein
                        organism = Gallus gallus
SEQUENCE: 93
SILSEEGVPI SSG                                                     13

SEQ ID NO: 94           moltype = AA  length = 13
FEATURE                 Location/Qualifiers
source                  1..13
                        mol_type = protein
                        organism = Gallus gallus
SEQUENCE: 94
VMGCKAAGAS RII                                                     13

SEQ ID NO: 95           moltype = AA  length = 13
FEATURE                 Location/Qualifiers
source                  1..13
                        mol_type = protein
                        organism = Gallus gallus
SEQUENCE: 95
SPVVVTLPGP ILS                                                     13

SEQ ID NO: 96           moltype = AA  length = 12
FEATURE                 Location/Qualifiers
source                  1..12
                        mol_type = protein
                        organism = Gallus gallus
SEQUENCE: 96
SRVVIQPSPV VV                                                      12

SEQ ID NO: 97           moltype = AA  length = 13
FEATURE                 Location/Qualifiers
source                  1..13
                        mol_type = protein
                        organism = Gallus gallus
SEQUENCE: 97
PSPVVVTLPG PIL                                                     13
```

```
SEQ ID NO: 98           moltype = AA  length = 12
FEATURE                 Location/Qualifiers
source                  1..12
                        mol_type = protein
                        organism = Gallus gallus
SEQUENCE: 98
RVVIQPSPVV VT                                                              12

SEQ ID NO: 99           moltype = AA  length = 13
FEATURE                 Location/Qualifiers
source                  1..13
                        mol_type = protein
                        organism = Gallus gallus
SEQUENCE: 99
PPPVVVTLPG PIL                                                             13

SEQ ID NO: 100          moltype = AA  length = 15
FEATURE                 Location/Qualifiers
source                  1..15
                        mol_type = protein
                        organism = Gallus gallus
SEQUENCE: 100
GVPISSGGFG ISGLG                                                           15

SEQ ID NO: 101          moltype = AA  length = 13
FEATURE                 Location/Qualifiers
source                  1..13
                        mol_type = protein
                        organism = Gallus gallus
SEQUENCE: 101
VIQPSPVVVT LPG                                                             13

SEQ ID NO: 102          moltype = AA  length = 15
FEATURE                 Location/Qualifiers
source                  1..15
                        mol_type = protein
                        organism = Gallus gallus
SEQUENCE: 102
AVGSSTSAAV GSILS                                                           15

SEQ ID NO: 103          moltype = AA  length = 15
FEATURE                 Location/Qualifiers
source                  1..15
                        mol_type = protein
                        organism = Gallus gallus
SEQUENCE: 103
TAVGSSTSAA VGSIL                                                           15

SEQ ID NO: 104          moltype = AA  length = 14
FEATURE                 Location/Qualifiers
source                  1..14
                        mol_type = protein
                        organism = Gallus gallus
SEQUENCE: 104
SGGFGISGLG SRFS                                                            14

SEQ ID NO: 105          moltype = AA  length = 13
FEATURE                 Location/Qualifiers
source                  1..13
                        mol_type = protein
                        organism = Gallus gallus
SEQUENCE: 105
VVVTLPGPIL SSF                                                             13

SEQ ID NO: 106          moltype = AA  length = 13
FEATURE                 Location/Qualifiers
source                  1..13
                        mol_type = protein
                        organism = Gallus gallus
SEQUENCE: 106
PPPVVVTFPG PIL                                                             13

SEQ ID NO: 107          moltype = AA  length = 14
FEATURE                 Location/Qualifiers
source                  1..14
                        mol_type = protein
                        organism = Gallus gallus
```

```
SEQUENCE: 107
GLGGFGWSGL GRGL                                                    14

SEQ ID NO: 108          moltype = AA  length = 13
FEATURE                 Location/Qualifiers
source                  1..13
                        mol_type = protein
                        organism = Gallus gallus
SEQUENCE: 108
VTLPGPILSS FPQ                                                     13

SEQ ID NO: 109          moltype = AA  length = 14
FEATURE                 Location/Qualifiers
source                  1..14
                        mol_type = protein
                        organism = Gallus gallus
SEQUENCE: 109
AVGSILSEEG VPIS                                                    14

SEQ ID NO: 110          moltype = AA  length = 14
FEATURE                 Location/Qualifiers
source                  1..14
                        mol_type = protein
                        organism = Gallus gallus
SEQUENCE: 110
SLGLGGFGWS GLGR                                                    14

SEQ ID NO: 111          moltype = AA  length = 14
FEATURE                 Location/Qualifiers
source                  1..14
                        mol_type = protein
                        organism = Gallus gallus
SEQUENCE: 111
PSPVVVTLPG PILS                                                    14

SEQ ID NO: 112          moltype = AA  length = 13
FEATURE                 Location/Qualifiers
source                  1..13
                        mol_type = protein
                        organism = Gallus gallus
SEQUENCE: 112
SRVVIQPSPV VVT                                                     13

SEQ ID NO: 113          moltype = AA  length = 15
FEATURE                 Location/Qualifiers
source                  1..15
                        mol_type = protein
                        organism = Gallus gallus
SEQUENCE: 113
SGGFGISGLG SRFSG                                                   15

SEQ ID NO: 114          moltype = AA  length = 14
FEATURE                 Location/Qualifiers
source                  1..14
                        mol_type = protein
                        organism = Gallus gallus
SEQUENCE: 114
PPPVVVTLPG PILS                                                    14

SEQ ID NO: 115          moltype = AA  length = 14
FEATURE                 Location/Qualifiers
source                  1..14
                        mol_type = protein
                        organism = Gallus gallus
SEQUENCE: 115
VAIQPPPVVV TLPG                                                    14

SEQ ID NO: 116          moltype = AA  length = 15
FEATURE                 Location/Qualifiers
source                  1..15
                        mol_type = protein
                        organism = Gallus gallus
SEQUENCE: 116
PISSGGFGIS GLGSR                                                   15

SEQ ID NO: 117          moltype = AA  length = 13
FEATURE                 Location/Qualifiers
```

source 1..13
mol_type = protein
organism = Gallus gallus
SEQUENCE: 117
PIVDVAEALL HVK 13

SEQ ID NO: 118 moltype = AA length = 14
FEATURE Location/Qualifiers
source 1..14
mol_type = protein
organism = Gallus gallus
SEQUENCE: 118
VVIQPSPVVV TLPG 14

SEQ ID NO: 119 moltype = AA length = 13
FEATURE Location/Qualifiers
source 1..13
mol_type = protein
organism = Gallus gallus
SEQUENCE: 119
RVVIQPSPVV VTL 13

SEQ ID NO: 120 moltype = AA length = 16
FEATURE Location/Qualifiers
source 1..16
mol_type = protein
organism = Gallus gallus
SEQUENCE: 120
TAVGSSTSAA VGSILS 16

SEQ ID NO: 121 moltype = AA length = 14
FEATURE Location/Qualifiers
source 1..14
mol_type = protein
organism = Gallus gallus
SEQUENCE: 121
PPPVVVTFPG PILS 14

SEQ ID NO: 122 moltype = AA length = 15
FEATURE Location/Qualifiers
source 1..15
mol_type = protein
organism = Gallus gallus
SEQUENCE: 122
SLGLGGFGWS GLGRG 15

SEQ ID NO: 123 moltype = AA length = 14
FEATURE Location/Qualifiers
source 1..14
mol_type = protein
organism = Gallus gallus
SEQUENCE: 123
VVVTLPGPIL SSFP 14

SEQ ID NO: 124 moltype = AA length = 14
FEATURE Location/Qualifiers
source 1..14
mol_type = protein
organism = Gallus gallus
SEQUENCE: 124
PVVVTLPGPI LSSF 14

SEQ ID NO: 125 moltype = AA length = 15
FEATURE Location/Qualifiers
source 1..15
mol_type = protein
organism = Gallus gallus
SEQUENCE: 125
AAVGSILSEE GVPIS 15

SEQ ID NO: 126 moltype = AA length = 15
FEATURE Location/Qualifiers
source 1..15
mol_type = protein
organism = Gallus gallus
SEQUENCE: 126
SAAVGSILSE EGVPI 15

SEQ ID NO: 127 moltype = AA length = 16

```
FEATURE                 Location/Qualifiers
source                  1..16
                        mol_type = protein
                        organism = Gallus gallus
SEQUENCE: 127
EGVPISSGGF GISGLG                                                     16

SEQ ID NO: 128          moltype = AA  length = 14
FEATURE                 Location/Qualifiers
source                  1..14
                        mol_type = protein
                        organism = Gallus gallus
SEQUENCE: 128
VVTLPGPILS SFPQ                                                       14

SEQ ID NO: 129          moltype = AA  length = 15
FEATURE                 Location/Qualifiers
source                  1..15
                        mol_type = protein
                        organism = Gallus gallus
SEQUENCE: 129
PSPVVVTLPG PILSS                                                      15

SEQ ID NO: 130          moltype = AA  length = 16
FEATURE                 Location/Qualifiers
source                  1..16
                        mol_type = protein
                        organism = Gallus gallus
SEQUENCE: 130
GKDGPKGVRG DAGPPG                                                     16

SEQ ID NO: 131          moltype = AA  length = 15
FEATURE                 Location/Qualifiers
source                  1..15
                        mol_type = protein
                        organism = Gallus gallus
SEQUENCE: 131
SVAIQPPPVV VTLPG                                                      15

SEQ ID NO: 132          moltype = AA  length = 14
FEATURE                 Location/Qualifiers
source                  1..14
                        mol_type = protein
                        organism = Gallus gallus
SEQUENCE: 132
SRVVIQPSPV VVTL                                                       14

SEQ ID NO: 133          moltype = AA  length = 14
FEATURE                 Location/Qualifiers
source                  1..14
                        mol_type = protein
                        organism = Gallus gallus
SEQUENCE: 133
LHTEAAATVP DRSE                                                       14

SEQ ID NO: 134          moltype = AA  length = 15
FEATURE                 Location/Qualifiers
source                  1..15
                        mol_type = protein
                        organism = Gallus gallus
SEQUENCE: 134
VVIQPSPVVV TLPGP                                                      15

SEQ ID NO: 135          moltype = AA  length = 14
FEATURE                 Location/Qualifiers
source                  1..14
                        mol_type = protein
                        organism = Gallus gallus
SEQUENCE: 135
RVVIQPSPVV VTLP                                                       14

SEQ ID NO: 136          moltype = AA  length = 16
FEATURE                 Location/Qualifiers
source                  1..16
                        mol_type = protein
                        organism = Gallus gallus
SEQUENCE: 136
SAAVGSILSE EGVPIS                                                     16
```

```
SEQ ID NO: 137          moltype = AA  length = 15
FEATURE                 Location/Qualifiers
source                  1..15
                        mol_type = protein
                        organism = Gallus gallus
SEQUENCE: 137
PVVVTLPGPI LSSFP                                                    15

SEQ ID NO: 138          moltype = AA  length = 15
FEATURE                 Location/Qualifiers
source                  1..15
                        mol_type = protein
                        organism = Gallus gallus
SEQUENCE: 138
IQPSPVVVTL PGPIL                                                    15

SEQ ID NO: 139          moltype = AA  length = 17
FEATURE                 Location/Qualifiers
source                  1..17
                        mol_type = protein
                        organism = Gallus gallus
SEQUENCE: 139
SVPIGAGGSL GLGGFGW                                                  17

SEQ ID NO: 140          moltype = AA  length = 16
FEATURE                 Location/Qualifiers
source                  1..16
                        mol_type = protein
                        organism = Gallus gallus
SEQUENCE: 140
SLGLGGFGWS GLGRGL                                                   16

SEQ ID NO: 141          moltype = AA  length = 17
FEATURE                 Location/Qualifiers
source                  1..17
                        mol_type = protein
                        organism = Gallus gallus
SEQUENCE: 141
FGGGFGGGDG ILPAGEK                                                  17

SEQ ID NO: 142          moltype = AA  length = 17
FEATURE                 Location/Qualifiers
source                  1..17
                        mol_type = protein
                        organism = Gallus gallus
SEQUENCE: 142
TAVGSSTSAA VGSILSE                                                  17

SEQ ID NO: 143          moltype = AA  length = 16
FEATURE                 Location/Qualifiers
source                  1..16
                        mol_type = protein
                        organism = Gallus gallus
SEQUENCE: 143
PISSGGFGIS GLGSRF                                                   16

SEQ ID NO: 144          moltype = AA  length = 19
FEATURE                 Location/Qualifiers
source                  1..19
                        mol_type = protein
                        organism = Gallus gallus
SEQUENCE: 144
SAAVGSSLSA GSVPIGAGG                                                19

SEQ ID NO: 145          moltype = AA  length = 17
FEATURE                 Location/Qualifiers
source                  1..17
                        mol_type = protein
                        organism = Gallus gallus
SEQUENCE: 145
GVPISSGGFG ISGLGSR                                                  17

SEQ ID NO: 146          moltype = AA  length = 15
FEATURE                 Location/Qualifiers
source                  1..15
                        mol_type = protein
                        organism = Gallus gallus
SEQUENCE: 146
VVVTLPGPIL SSFPQ                                                    15
```

```
SEQ ID NO: 147          moltype = AA  length = 15
FEATURE                 Location/Qualifiers
source                  1..15
                        mol_type = protein
                        organism = Gallus gallus
SEQUENCE: 147
RVVIQPSPVV VTLPG                                                15

SEQ ID NO: 148          moltype = AA  length = 15
FEATURE                 Location/Qualifiers
source                  1..15
                        mol_type = protein
                        organism = Gallus gallus
SEQUENCE: 148
SRVVIQPSPV VVTLP                                                15

SEQ ID NO: 149          moltype = AA  length = 16
FEATURE                 Location/Qualifiers
source                  1..16
                        mol_type = protein
                        organism = Gallus gallus
SEQUENCE: 149
PSPVVVTLPG PILSSF                                               16

SEQ ID NO: 150          moltype = AA  length = 16
FEATURE                 Location/Qualifiers
source                  1..16
                        mol_type = protein
                        organism = Gallus gallus
SEQUENCE: 150
AIQPPPVVVT LPGPIL                                               16

SEQ ID NO: 151          moltype = AA  length = 16
FEATURE                 Location/Qualifiers
source                  1..16
                        mol_type = protein
                        organism = Gallus gallus
SEQUENCE: 151
IQPSPVVVTL PGPILS                                               16

SEQ ID NO: 152          moltype = AA  length = 16
FEATURE                 Location/Qualifiers
source                  1..16
                        mol_type = protein
                        organism = Gallus gallus
SEQUENCE: 152
VIQPSPVVVT LPGPIL                                               16

SEQ ID NO: 153          moltype = AA  length = 17
FEATURE                 Location/Qualifiers
source                  1..17
                        mol_type = protein
                        organism = Gallus gallus
SEQUENCE: 153
VPISSGGFGI SGLGSRF                                              17

SEQ ID NO: 154          moltype = AA  length = 16
FEATURE                 Location/Qualifiers
source                  1..16
                        mol_type = protein
                        organism = Gallus gallus
SEQUENCE: 154
SRVVIQPSPV VVTLPG                                               16

SEQ ID NO: 155          moltype = AA  length = 17
FEATURE                 Location/Qualifiers
source                  1..17
                        mol_type = protein
                        organism = Gallus gallus
SEQUENCE: 155
SILSEEGVPI SSGGFGI                                              17

SEQ ID NO: 156          moltype = AA  length = 16
FEATURE                 Location/Qualifiers
source                  1..16
                        mol_type = protein
                        organism = Gallus gallus
```

```
SEQUENCE: 156
PVVVTLPGPI LSSFPQ                                                   16

SEQ ID NO: 157         moltype = AA  length = 16
FEATURE                Location/Qualifiers
source                 1..16
                       mol_type = protein
                       organism = Gallus gallus
SEQUENCE: 157
RVVIQPSPVV VTLPGP                                                   16

SEQ ID NO: 158         moltype = AA  length = 18
FEATURE                Location/Qualifiers
source                 1..18
                       mol_type = protein
                       organism = Gallus gallus
SEQUENCE: 158
SAAVGSILSE EGVPISSG                                                 18

SEQ ID NO: 159         moltype = AA  length = 16
FEATURE                Location/Qualifiers
source                 1..16
                       mol_type = protein
                       organism = Gallus gallus
SEQUENCE: 159
VVVTLPGPIL SSFPQN                                                   16

SEQ ID NO: 160         moltype = AA  length = 18
FEATURE                Location/Qualifiers
source                 1..18
                       mol_type = protein
                       organism = Gallus gallus
SEQUENCE: 160
GVPISSGGFG ISGLGSRF                                                 18

SEQ ID NO: 161         moltype = AA  length = 17
FEATURE                Location/Qualifiers
source                 1..17
                       mol_type = protein
                       organism = Gallus gallus
SEQUENCE: 161
PSPVVVTLPG PILSSFP                                                  17

SEQ ID NO: 162         moltype = AA  length = 17
FEATURE                Location/Qualifiers
source                 1..17
                       mol_type = protein
                       organism = Gallus gallus
SEQUENCE: 162
VAIQPPPVVV TLPGPIL                                                  17

SEQ ID NO: 163         moltype = AA  length = 17
FEATURE                Location/Qualifiers
source                 1..17
                       mol_type = protein
                       organism = Gallus gallus
SEQUENCE: 163
VIQPSPVVVT LPGPILS                                                  17

SEQ ID NO: 164         moltype = AA  length = 17
FEATURE                Location/Qualifiers
source                 1..17
                       mol_type = protein
                       organism = Gallus gallus
SEQUENCE: 164
VVIQPSPVVV TLPGPIL                                                  17

SEQ ID NO: 165         moltype = AA  length = 17
FEATURE                Location/Qualifiers
source                 1..17
                       mol_type = protein
                       organism = Gallus gallus
SEQUENCE: 165
SPVVVTLPGP ILSSFPQ                                                  17

SEQ ID NO: 166         moltype = AA  length = 15
FEATURE                Location/Qualifiers
```

```
source                 1..15
                       mol_type = protein
                       organism = Gallus gallus
SEQUENCE: 166
VILSNTKTQY SIKIH                                                15

SEQ ID NO: 167         moltype = AA  length = 17
FEATURE                Location/Qualifiers
source                 1..17
                       mol_type = protein
                       organism = Gallus gallus
SEQUENCE: 167
SRVVIQPSPV VVTLPGP                                              17

SEQ ID NO: 168         moltype = AA  length = 17
FEATURE                Location/Qualifiers
source                 1..17
                       mol_type = protein
                       organism = Gallus gallus
SEQUENCE: 168
DSRVVIQPSP VVVTLPG                                              17

SEQ ID NO: 169         moltype = AA  length = 17
FEATURE                Location/Qualifiers
source                 1..17
                       mol_type = protein
                       organism = Gallus gallus
SEQUENCE: 169
PVVVTLPGPI LSSFPQN                                              17

SEQ ID NO: 170         moltype = AA  length = 17
FEATURE                Location/Qualifiers
source                 1..17
                       mol_type = protein
                       organism = Gallus gallus
SEQUENCE: 170
RVVIQPSPVV VTLPGPI                                              17

SEQ ID NO: 171         moltype = AA  length = 19
FEATURE                Location/Qualifiers
source                 1..19
                       mol_type = protein
                       organism = Gallus gallus
SEQUENCE: 171
GVPISSGGFG ISGLGSRFS                                            19

SEQ ID NO: 172         moltype = AA  length = 18
FEATURE                Location/Qualifiers
source                 1..18
                       mol_type = protein
                       organism = Gallus gallus
SEQUENCE: 172
SVAIQPPPVV VTLPGPIL                                             18

SEQ ID NO: 173         moltype = AA  length = 18
FEATURE                Location/Qualifiers
source                 1..18
                       mol_type = protein
                       organism = Gallus gallus
SEQUENCE: 173
VAIQPPPVVV TLPGPILS                                             18

SEQ ID NO: 174         moltype = AA  length = 18
FEATURE                Location/Qualifiers
source                 1..18
                       mol_type = protein
                       organism = Gallus gallus
SEQUENCE: 174
VVIQPSPVVV TLPGPILS                                             18

SEQ ID NO: 175         moltype = AA  length = 18
FEATURE                Location/Qualifiers
source                 1..18
                       mol_type = protein
                       organism = Gallus gallus
SEQUENCE: 175
PSPVVVTLPG PILSSFPQ                                             18

SEQ ID NO: 176         moltype = AA  length = 20
```

```
FEATURE                 Location/Qualifiers
source                  1..20
                        mol_type = protein
                        organism = Gallus gallus
SEQUENCE: 176
GVPISSGGFG ISGLGSRFSG                                                20

SEQ ID NO: 177          moltype = AA  length = 18
FEATURE                 Location/Qualifiers
source                  1..18
                        mol_type = protein
                        organism = Gallus gallus
SEQUENCE: 177
AVPLVRPVTM VPSIPGIP                                                  18

SEQ ID NO: 178          moltype = AA  length = 18
FEATURE                 Location/Qualifiers
source                  1..18
                        mol_type = protein
                        organism = Gallus gallus
SEQUENCE: 178
PPPVVVTLPG PILSSFPQ                                                  18

SEQ ID NO: 179          moltype = AA  length = 18
FEATURE                 Location/Qualifiers
source                  1..18
                        mol_type = protein
                        organism = Gallus gallus
SEQUENCE: 179
SPVVVTLPGP ILSSFPQN                                                  18

SEQ ID NO: 180          moltype = AA  length = 18
FEATURE                 Location/Qualifiers
source                  1..18
                        mol_type = protein
                        organism = Gallus gallus
SEQUENCE: 180
LPGPGLQLLH GTTTLAFK                                                  18

SEQ ID NO: 181          moltype = AA  length = 18
FEATURE                 Location/Qualifiers
source                  1..18
                        mol_type = protein
                        organism = Gallus gallus
SEQUENCE: 181
PPPVVVTFPG PILSSFPQ                                                  18

SEQ ID NO: 182          moltype = AA  length = 19
FEATURE                 Location/Qualifiers
source                  1..19
                        mol_type = protein
                        organism = Gallus gallus
SEQUENCE: 182
SVAIQPPPVV VTLPGPILS                                                 19

SEQ ID NO: 183          moltype = AA  length = 19
FEATURE                 Location/Qualifiers
source                  1..19
                        mol_type = protein
                        organism = Gallus gallus
SEQUENCE: 183
SSVAIQPPPV VVTLPGPIL                                                 19

SEQ ID NO: 184          moltype = AA  length = 18
FEATURE                 Location/Qualifiers
source                  1..18
                        mol_type = protein
                        organism = Gallus gallus
SEQUENCE: 184
RVVIQPSPVV VTLPGPIL                                                  18

SEQ ID NO: 185          moltype = AA  length = 19
FEATURE                 Location/Qualifiers
source                  1..19
                        mol_type = protein
                        organism = Gallus gallus
SEQUENCE: 185
PSPVVVTLPG PILSSFPQN                                                 19
```

```
SEQ ID NO: 186         moltype = AA  length = 21
FEATURE                Location/Qualifiers
source                 1..21
                       mol_type = protein
                       organism = Gallus gallus
SEQUENCE: 186
SILSEEGVPI SSGGFGISGL G                                              21

SEQ ID NO: 187         moltype = AA  length = 19
FEATURE                Location/Qualifiers
source                 1..19
                       mol_type = protein
                       organism = Gallus gallus
SEQUENCE: 187
SRVVIQPSPV VVTLPGPIL                                                 19

SEQ ID NO: 188         moltype = AA  length = 19
FEATURE                Location/Qualifiers
source                 1..19
                       mol_type = protein
                       organism = Gallus gallus
SEQUENCE: 188
RVVIQPSPVV VTLPGPILS                                                 19

SEQ ID NO: 189         moltype = AA  length = 22
FEATURE                Location/Qualifiers
source                 1..22
                       mol_type = protein
                       organism = Gallus gallus
SEQUENCE: 189
SVPIGAGGSL GLGGFGWSGL GR                                             22

SEQ ID NO: 190         moltype = AA  length = 22
FEATURE                Location/Qualifiers
source                 1..22
                       mol_type = protein
                       organism = Gallus gallus
SEQUENCE: 190
TAVGSSTSAA VGSILSEEGV PI                                             22

SEQ ID NO: 191         moltype = AA  length = 22
FEATURE                Location/Qualifiers
source                 1..22
                       mol_type = protein
                       organism = Gallus gallus
SEQUENCE: 191
SAAVGSILSE EGVPISSGGF GI                                             22

SEQ ID NO: 192         moltype = AA  length = 21
FEATURE                Location/Qualifiers
source                 1..21
                       mol_type = protein
                       organism = Gallus gallus
SEQUENCE: 192
SEEGVPISSG GFGISGLGSR F                                              21

SEQ ID NO: 193         moltype = AA  length = 20
FEATURE                Location/Qualifiers
source                 1..20
                       mol_type = protein
                       organism = Gallus gallus
SEQUENCE: 193
SRVVIQPSPV VVTLPGPILS                                                20

SEQ ID NO: 194         moltype = AA  length = 23
FEATURE                Location/Qualifiers
source                 1..23
                       mol_type = protein
                       organism = Gallus gallus
SEQUENCE: 194
SVPIGAGGSL GLGGFGWSGL GRG                                            23

SEQ ID NO: 195         moltype = AA  length = 20
FEATURE                Location/Qualifiers
source                 1..20
                       mol_type = protein
                       organism = Gallus gallus
SEQUENCE: 195
DSRVVIQPSP VVVTLPGPIL                                                20
```

```
SEQ ID NO: 196          moltype = AA  length = 23
FEATURE                 Location/Qualifiers
source                  1..23
                        mol_type = protein
                        organism = Gallus gallus
SEQUENCE: 196
TAVGSSTSAA VGSILSEEGV PIS                                          23

SEQ ID NO: 197          moltype = AA  length = 22
FEATURE                 Location/Qualifiers
source                  1..22
                        mol_type = protein
                        organism = Gallus gallus
SEQUENCE: 197
LRGDVGPVGR TGEQGIAGPP GF                                           22

SEQ ID NO: 198          moltype = AA  length = 21
FEATURE                 Location/Qualifiers
source                  1..21
                        mol_type = protein
                        organism = Gallus gallus
SEQUENCE: 198
SRVVIQPSPV VVTLPGPILS S                                            21

SEQ ID NO: 199          moltype = AA  length = 21
FEATURE                 Location/Qualifiers
source                  1..21
                        mol_type = protein
                        organism = Gallus gallus
SEQUENCE: 199
VVIQPSPVVV TLPGPILSSF P                                            21

SEQ ID NO: 200          moltype = AA  length = 22
FEATURE                 Location/Qualifiers
source                  1..22
                        mol_type = protein
                        organism = Gallus gallus
SEQUENCE: 200
GVPISSGGFG ISGLGSRFSG RR                                           22

SEQ ID NO: 201          moltype = AA  length = 24
FEATURE                 Location/Qualifiers
source                  1..24
                        mol_type = protein
                        organism = Gallus gallus
SEQUENCE: 201
SVPIGAGGSL GLGGFGWSGL GRGL                                         24

SEQ ID NO: 202          moltype = AA  length = 21
FEATURE                 Location/Qualifiers
source                  1..21
                        mol_type = protein
                        organism = Gallus gallus
SEQUENCE: 202
DSRVVIQPSP VVVTLPGPIL S                                            21

SEQ ID NO: 203          moltype = AA  length = 21
FEATURE                 Location/Qualifiers
source                  1..21
                        mol_type = protein
                        organism = Gallus gallus
SEQUENCE: 203
VIQPSPVVVT LPGPILSSFP Q                                            21

SEQ ID NO: 204          moltype = AA  length = 24
FEATURE                 Location/Qualifiers
source                  1..24
                        mol_type = protein
                        organism = Gallus gallus
SEQUENCE: 204
AVGSILSEEG VPISSGGFGI SGLG                                         24

SEQ ID NO: 205          moltype = AA  length = 21
FEATURE                 Location/Qualifiers
source                  1..21
                        mol_type = protein
                        organism = Gallus gallus
```

```
SEQUENCE: 205
RVVIQPSPVV VTLPGPILSS F                                          21

SEQ ID NO: 206          moltype = AA  length = 23
FEATURE                 Location/Qualifiers
source                  1..23
                        mol_type = protein
                        organism = Gallus gallus
SEQUENCE: 206
SILSEEGVPI SSGGFGISGL GSR                                        23

SEQ ID NO: 207          moltype = AA  length = 21
FEATURE                 Location/Qualifiers
source                  1..21
                        mol_type = protein
                        organism = Gallus gallus
SEQUENCE: 207
IPSSVPESSF KIKGNSSSFH I                                          21

SEQ ID NO: 208          moltype = AA  length = 22
FEATURE                 Location/Qualifiers
source                  1..22
                        mol_type = protein
                        organism = Gallus gallus
SEQUENCE: 208
VAIQPPPVVV TLPGPILSSF PQ                                         22

SEQ ID NO: 209          moltype = AA  length = 25
FEATURE                 Location/Qualifiers
source                  1..25
                        mol_type = protein
                        organism = Gallus gallus
SEQUENCE: 209
TAVGSSTSAA VGSILSEEGV PISSG                                      25

SEQ ID NO: 210          moltype = AA  length = 22
FEATURE                 Location/Qualifiers
source                  1..22
                        mol_type = protein
                        organism = Gallus gallus
SEQUENCE: 210
VVIQPSPVVV TLPGPILSSF PQ                                         22

SEQ ID NO: 211          moltype = AA  length = 23
FEATURE                 Location/Qualifiers
source                  1..23
                        mol_type = protein
                        organism = Gallus gallus
SEQUENCE: 211
PSPVVVTLPG PILSSFPQNT AVG                                        23

SEQ ID NO: 212          moltype = AA  length = 20
FEATURE                 Location/Qualifiers
source                  1..20
                        mol_type = protein
                        organism = Gallus gallus
SEQUENCE: 212
KENFEVLCKD GTRKPVTDAE                                            20

SEQ ID NO: 213          moltype = AA  length = 21
FEATURE                 Location/Qualifiers
source                  1..21
                        mol_type = protein
                        organism = Gallus gallus
SEQUENCE: 213
SIQACKLAQS HGWGVMVSHR S                                          21

SEQ ID NO: 214          moltype = AA  length = 22
FEATURE                 Location/Qualifiers
source                  1..22
                        mol_type = protein
                        organism = Gallus gallus
SEQUENCE: 214
SRVVIQPSPV VVTLPGPILS SF                                         22

SEQ ID NO: 215          moltype = AA  length = 22
FEATURE                 Location/Qualifiers
```

```
source                  1..22
                        mol_type = protein
                        organism = Gallus gallus
SEQUENCE: 215
RVVIQPSPVV VTLPGPILSS FP                                                   22

SEQ ID NO: 216          moltype = AA  length = 23
FEATURE                 Location/Qualifiers
source                  1..23
                        mol_type = protein
                        organism = Gallus gallus
SEQUENCE: 216
EQPPLCVASV SVKEPASETP AVP                                                  23

SEQ ID NO: 217          moltype = AA  length = 23
FEATURE                 Location/Qualifiers
source                  1..23
                        mol_type = protein
                        organism = Gallus gallus
SEQUENCE: 217
SVAIQPPPVV VTLPGPILSS FPQ                                                  23

SEQ ID NO: 218          moltype = AA  length = 26
FEATURE                 Location/Qualifiers
source                  1..26
                        mol_type = protein
                        organism = Gallus gallus
SEQUENCE: 218
SAAVGSILSE EGVPISSGGF GISGLG                                               26

SEQ ID NO: 219          moltype = AA  length = 24
FEATURE                 Location/Qualifiers
source                  1..24
                        mol_type = protein
                        organism = Gallus gallus
SEQUENCE: 219
SILSEEGVPI SSGGFGISGL GSRF                                                 24

SEQ ID NO: 220          moltype = AA  length = 24
FEATURE                 Location/Qualifiers
source                  1..24
                        mol_type = protein
                        organism = Gallus gallus
SEQUENCE: 220
PSPVVVTLPG PILSSFPQNT AVGS                                                 24

SEQ ID NO: 221          moltype = AA  length = 23
FEATURE                 Location/Qualifiers
source                  1..23
                        mol_type = protein
                        organism = Gallus gallus
SEQUENCE: 221
VVIQPSPVVV TLPGPILSSF PQN                                                  23

SEQ ID NO: 222          moltype = AA  length = 23
FEATURE                 Location/Qualifiers
source                  1..23
                        mol_type = protein
                        organism = Gallus gallus
SEQUENCE: 222
SRVVIQPSPV VVTLPGPILS SFP                                                  23

SEQ ID NO: 223          moltype = AA  length = 24
FEATURE                 Location/Qualifiers
source                  1..24
                        mol_type = protein
                        organism = Gallus gallus
SEQUENCE: 223
SSVAIQPPPV VVTLPGPILS SFPQ                                                 24

SEQ ID NO: 224          moltype = AA  length = 23
FEATURE                 Location/Qualifiers
source                  1..23
                        mol_type = protein
                        organism = Gallus gallus
SEQUENCE: 224
RVVIQPSPVV VTLPGPILSS FPQ                                                  23

SEQ ID NO: 225          moltype = AA  length = 25
```

```
FEATURE                Location/Qualifiers
source                 1..25
                       mol_type = protein
                       organism = Gallus gallus
SEQUENCE: 225
SILSEEGVPI SSGGFGISGL GSRFS                                          25

SEQ ID NO: 226         moltype = AA  length = 27
FEATURE                Location/Qualifiers
source                 1..27
                       mol_type = protein
                       organism = Gallus gallus
SEQUENCE: 226
TSAAVGSILS EEGVPISSGG FGISGLG                                        27

SEQ ID NO: 227         moltype = AA  length = 26
FEATURE                Location/Qualifiers
source                 1..26
                       mol_type = protein
                       organism = Gallus gallus
SEQUENCE: 227
SILSEEGVPI SSGGFGISGL GSRFSG                                         26

SEQ ID NO: 228         moltype = AA  length = 24
FEATURE                Location/Qualifiers
source                 1..24
                       mol_type = protein
                       organism = Gallus gallus
SEQUENCE: 228
SRVVIQPSPV VVTLPGPILS SFPQ                                           24

SEQ ID NO: 229         moltype = AA  length = 28
FEATURE                Location/Qualifiers
source                 1..28
                       mol_type = protein
                       organism = Gallus gallus
SEQUENCE: 229
TAVGSSTSAA VGSILSEEGV PISSGGFG                                       28

SEQ ID NO: 230         moltype = AA  length = 28
FEATURE                Location/Qualifiers
source                 1..28
                       mol_type = protein
                       organism = Gallus gallus
SEQUENCE: 230
STSAAVGSIL SEEGVPISSG GFGISGLG                                       28

SEQ ID NO: 231         moltype = AA  length = 24
FEATURE                Location/Qualifiers
source                 1..24
                       mol_type = protein
                       organism = Gallus gallus
SEQUENCE: 231
RVVIQPSPVV VTLPGPILSS FPQN                                           24

SEQ ID NO: 232         moltype = AA  length = 25
FEATURE                Location/Qualifiers
source                 1..25
                       mol_type = protein
                       organism = Gallus gallus
SEQUENCE: 232
SRVVIQPSPV VVTLPGPILS SFPQN                                          25

SEQ ID NO: 233         moltype = AA  length = 25
FEATURE                Location/Qualifiers
source                 1..25
                       mol_type = protein
                       organism = Gallus gallus
SEQUENCE: 233
DSRVVIQPSP VVVTLPGPIL SSFPQ                                          25

SEQ ID NO: 234         moltype = AA  length = 29
FEATURE                Location/Qualifiers
source                 1..29
                       mol_type = protein
                       organism = Gallus gallus
SEQUENCE: 234
TAVGSSTSAA VGSILSEEGV PISSGGFGI                                      29
```

```
SEQ ID NO: 235         moltype = AA  length = 29
FEATURE                Location/Qualifiers
source                 1..29
                       mol_type = protein
                       organism = Gallus gallus
SEQUENCE: 235
SAAVGSILSE EGVPISSGGF GISGLGSRF                                     29

SEQ ID NO: 236         moltype = AA  length = 24
FEATURE                Location/Qualifiers
source                 1..24
                       mol_type = protein
                       organism = Gallus gallus
SEQUENCE: 236
VEQLVNLQHL DVAYNLLLEH AQLA                                          24

SEQ ID NO: 237         moltype = AA  length = 28
FEATURE                Location/Qualifiers
source                 1..28
                       mol_type = protein
                       organism = Gallus gallus
SEQUENCE: 237
SVAIQPPPVV VTLPGPILSS FPQSTAVG                                      28

SEQ ID NO: 238         moltype = AA  length = 28
FEATURE                Location/Qualifiers
source                 1..28
                       mol_type = protein
                       organism = Gallus gallus
SEQUENCE: 238
SILSEEGVPI SSGGFGISGL GSRFSGRR                                      28

SEQ ID NO: 239         moltype = AA  length = 30
FEATURE                Location/Qualifiers
source                 1..30
                       mol_type = protein
                       organism = Gallus gallus
SEQUENCE: 239
TSAAVGSILS EEGVPISSGG FGISGLGSRF                                    30

SEQ ID NO: 240         moltype = AA  length = 29
FEATURE                Location/Qualifiers
source                 1..29
                       mol_type = protein
                       organism = Gallus gallus
SEQUENCE: 240
SSVAIQPPPV VVTLPGPILS SFPQSTAVG                                     29

SEQ ID NO: 241         moltype = AA  length = 31
FEATURE                Location/Qualifiers
source                 1..31
                       mol_type = protein
                       organism = Gallus gallus
SEQUENCE: 241
STSAAVGSIL SEEGVPISSG GFGISGLGSR F                                  31

SEQ ID NO: 242         moltype = AA  length = 31
FEATURE                Location/Qualifiers
source                 1..31
                       mol_type = protein
                       organism = Gallus gallus
SEQUENCE: 242
PSPVVVTLPG PILSSFPQNT AVGSSTSAAV G                                  31

SEQ ID NO: 243         moltype = AA  length = 33
FEATURE                Location/Qualifiers
source                 1..33
                       mol_type = protein
                       organism = Gallus gallus
SEQUENCE: 243
TAVGSSTSAA VGSILSEEGV PISSGGFGIS GLG                                33

SEQ ID NO: 244         moltype = AA  length = 31
FEATURE                Location/Qualifiers
source                 1..31
                       mol_type = protein
                       organism = Gallus gallus
SEQUENCE: 244
AVGSILSEEG VPISSGGFGI SGLGSRFSGR R                                  31
```

```
SEQ ID NO: 245          moltype = AA  length = 27
FEATURE                 Location/Qualifiers
source                  1..27
                        mol_type = protein
                        organism = Gallus gallus
SEQUENCE: 245
NKVLVHCAMG RSRSATLVLA YLMIYKN                                 27

SEQ ID NO: 246          moltype = AA  length = 32
FEATURE                 Location/Qualifiers
source                  1..32
                        mol_type = protein
                        organism = Gallus gallus
SEQUENCE: 246
SSVAIQPPPV VVTLPGPILS SFPQSTAVGS TA                           32

SEQ ID NO: 247          moltype = AA  length = 32
FEATURE                 Location/Qualifiers
source                  1..32
                        mol_type = protein
                        organism = Gallus gallus
SEQUENCE: 247
AAVGSILSEE GVPISSGGFG ISGLGSRFSG RR                           32

SEQ ID NO: 248          moltype = AA  length = 35
FEATURE                 Location/Qualifiers
source                  1..35
                        mol_type = protein
                        organism = Gallus gallus
SEQUENCE: 248
TAVGSSTSAA VGSILSEEGV PISSGGFGIS GLGSR                        35

SEQ ID NO: 249          moltype = AA  length = 33
FEATURE                 Location/Qualifiers
source                  1..33
                        mol_type = protein
                        organism = Gallus gallus
SEQUENCE: 249
SAAVGSILSE EGVPISSGGF GISGLGSRFS GRR                          33

SEQ ID NO: 250          moltype = AA  length = 34
FEATURE                 Location/Qualifiers
source                  1..34
                        mol_type = protein
                        organism = Gallus gallus
SEQUENCE: 250
PSPVVVTLPG PILSSFPQNT AVGSSTSAAV GSIL                         34

SEQ ID NO: 251          moltype = AA  length = 35
FEATURE                 Location/Qualifiers
source                  1..35
                        mol_type = protein
                        organism = Gallus gallus
SEQUENCE: 251
PSPVVVTLPG PILSSFPQNT AVGSSTSAAV GSILS                        35

SEQ ID NO: 252          moltype = AA  length = 36
FEATURE                 Location/Qualifiers
source                  1..36
                        mol_type = protein
                        organism = Gallus gallus
SEQUENCE: 252
TAVGSSTSAA VGSILSEEGV PISSGGFGIS GLGSRF                       36

SEQ ID NO: 253          moltype = AA  length = 29
FEATURE                 Location/Qualifiers
source                  1..29
                        mol_type = protein
                        organism = Gallus gallus
SEQUENCE: 253
RPRVYLHCTN PRHPKYREGD VTLFALNLS                               29
```